(12) United States Patent
Asahara et al.

(10) Patent No.: US 6,542,195 B1
(45) Date of Patent: Apr. 1, 2003

(54) IMAGE PICK-UP APPARATUS FOR OUTPUTTING IMAGE FRAMES BY THINNING OUT THE SAME

(75) Inventors: Shuichi Asahara, Tokyo (JP); Keizo Kono, Tokyo (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 0 days.

(21) Appl. No.: 09/268,938

(22) Filed: Mar. 16, 1999

(30) Foreign Application Priority Data

Mar. 31, 1998 (JP) ............................................. 10-087166

(51) Int. Cl.⁷ .......................... H04N 11/20; H04N 7/01
(52) U.S. Cl. ........................................ 348/441; 348/701
(58) Field of Search ................................ 348/439.1, 459, 348/441, 443, 616, 597, 701, 620

(56) References Cited

U.S. PATENT DOCUMENTS 4,982,280 A  *  1/1991  Lyon et al. .................. 348/448
5,355,169 A  * 10/1994  Richards et al. ............. 348/459
5,517,248 A  *  5/1996  Isoda .......................... 348/441
5,574,512 A  * 11/1996  Saeger ........................ 348/620
5,668,914 A  *  9/1997  Inuiya et al. ................ 348/701

FOREIGN PATENT DOCUMENTS

| JP | P07-87446 | 3/1995 |
| JP | P07-303241 | 11/1995 |
| JP | P09-172594 | 6/1997 |

\* cited by examiner

*Primary Examiner*—Wendy R. Garber
*Assistant Examiner*—Jason Whipkey
(74) *Attorney, Agent, or Firm*—Gary M. Nath; Harold L. Novick; Marvin C. Berkowitz

(57) ABSTRACT

An invalid frame in 60P images supplied from a 60P camera head is delayed by a single frame by a 1-frame delay circuit. A differential between the delayed invalid frame and the valid frame is computed by a subtracting circuit. Of the differential signal, only a portion over a predetermined value is picked out by a level filter. The picked out signal is attenuated to ½ by a ½ attenuator. By adding that attenuated signal to the valid frame by an adder, the invalid frame is superimposed on that valid frame. As a result, a natural picture is obtained.

4 Claims, 7 Drawing Sheets

FIG.5
| (a) | (b) | (c) |
|---|---|---|
| 60P IMAGE | IMAGES OF VALID FRAMES LEFT BY THINNING OUT TO 30P IMAGE | 30P IMAGES SUBJECTED TO PROCESSING OF FIG.4 |
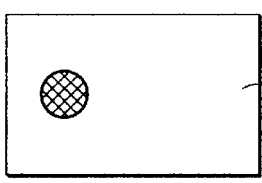 Ia
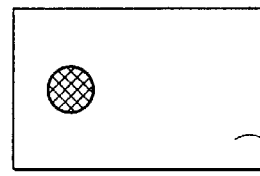 Va — Va 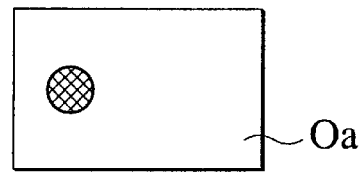 Oa
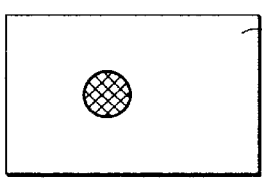 Ib
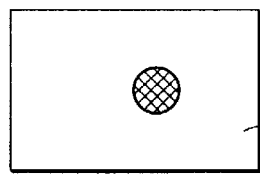 Vb — Vb 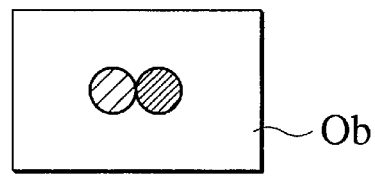 Ob
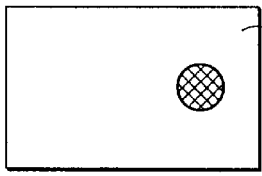 Ic
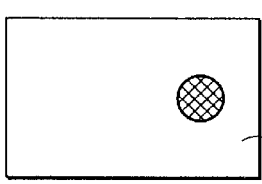 Vc — Vc 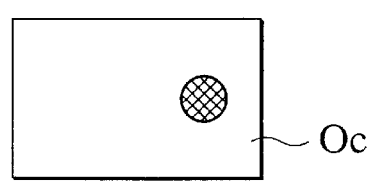 Oc
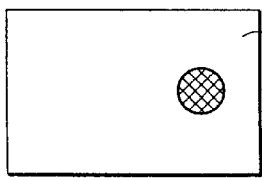 Id

IMAGE PICK-UP APPARATUS FOR OUTPUTTING IMAGE FRAMES BY THINNING OUT THE SAME

BACKGROUND OF THE INVENTION

1. Field of the Invention

The present invention relates to an image pick-up apparatus for thinning out (decimating), at a predetermined interval, a plurality of image frames outputted from a camera for taking and outputting pictures as a first predetermined number of frames per second so as to output a second predetermined number of image frames per second, the second predetermined number being smaller than the first predetermined number.

2. Description of the Related Art

Of various image pick-up systems expected to be used in digital broadcasting in the United States of America, the 30P system which handles about 30 frames per second without interlace has been attracting much attention from public because it is capable of realizing such a digital broadcasting at a very low cost by employing a part of conventional broadcasting system. However, according to this 30P system, in an picture having a large motion, slightly unnatural motions are produced because its frame frequency is low. Additionally, a 60P system camera which fetches actual images at a rate of 60 frames has been recently developed.

As described above, the 30P system has such a disadvantage that although this system is achieved at a very low cost, in a picture having a large motion, slightly unnatural motions are produced because its frame frequency is low.

SUMMARY OF THE INVENTION

Accordingly, it can be considered to use a 60P system camera which is capable of outputting images equivalent to when an interlace is provided, for a picture having a large motion and realize the 30P system by utilizing an output of the 60P system camera so as to produce a smooth motion for the picture having a large motion.

The present invention has been achieved in views of the above and an object of the invention is to provide an image pick-up apparatus capable of obtaining a natural image smooth in motion for even a picture having a large motion despite use of the 30P system.

To achieve the above object, there is provided an image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising: delaying means for delaying an invalid frame just before and picked out by a single frame relative to each of the second predetermined number of valid frames; subtracting means for computing a differential between the delayed invalid frame and a corresponding valid frame; filtering means for picking out only a portion over a predetermined value of the differential outputted from the subtracting means; attenuating means for attenuating the level of the portion of the differential picked out by the filtering means to ½; and adding means for adding the attenuated portion of the differential to the corresponding valid frame.

According to the present invention, an invalid frame just before a valid frame and picked out is delayed by a single frame and then a differential between the delayed invalid frame and the valid frame is computed. Of the differential, only a portion over a predetermined value is picked out and the picked out differential level is attenuated to ½ and then added to the valid frame. Therefore, an image of the invalid frame just before and picked out is superimposed on a 30P image, so that for even a picture having a large motion, smooth and natural images can be obtained.

Further, to achieve the above object, there is provided an image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising: delaying means for delaying an invalid frame just before and picked out by a single frame relative to each of the second predetermined number of valid frames; subtracting means for computing a differential between the delayed invalid frame and a corresponding valid frame; a 2-dimensional low pass filter for conducting 2-dimensional low pass filtering processing on the differential output from the subtracting means; filtering means for picking up only a portion over a predetermined value of the differential subjected to the 2-dimensional low pass filtering processing by the 2-dimensional low pass filter; attenuating means for attenuating the level of the portion of the differential picked up by the filtering means to ½; and adding means for adding the attenuated portion of the differential to the corresponding valid frame.

According to the present invention, an invalid frame just before a valid frame and picked out is delayed by a single frame and then a differential between the delayed invalid frame and the valid frame is computed. This differential is, subjected to the 2-dimensional low pass filtering processing, and of the differential, only a portion over a predetermined is picked out and this picked out differential level is attenuated to ½. This attenuated differential level is added to the valid frame. As a result, the image of the invalid frame just before and picked out is superimposed on the 30P image so that for even a picture having a large motion, smooth and natural images can be obtained. Specifically because detection of an image having a small motion is canceled by the 2-dimensional low pass filtering processing, further natural images can be obtained.

Further, to achieve the above object, there is provided an image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising: delaying means for delaying an invalid frame just before and picked out by a single frame relative to each of the second predetermined number of valid frames; subtracting means for computing a differential between the delayed invalid frame and a corresponding valid frame; a 2-dimensional low pass filter for conducting 2-dimensional low pass filtering processing on the differential output from the subtracting means; filtering means for picking up only a portion over a predetermined value of the differential subjected to the 2-dimensional low pass filtering processing by the 2-dimensional low pass filter; attenuating means for attenuating the level of the portion of the differential picked up by the filtering means to a range of 0–½; and adding means for adding the attenuated portion of the differential to the corresponding valid frame.

According to the present invention, the invalid frame just before the valid frame and picked out is delayed by a single frame and a differential between the delayed invalid frame and the valid frame is computed. This differential is subjected to the 2-dimensional low pass filtering processing and then, of the differential, only a portion over a predetermined value is picked out and the picked out differential level is attenuated to a range of 0–½ and added to the valid frame. As a result, the invalid frame just before and picked out is superimposed on the 30P image so that for a picture having a large motion, smooth and natural images can be obtained. Specifically by attenuating the differential level to a range of 0–½, even if a moving image is stopped suddenly, a natural image can be obtained.

Further, to achieve the above object, there is provided an image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising: first delaying means for delaying each of the second predetermined number of valid frames by a frame; second delaying means for delaying an invalid frame just before and picked out relative to each of the valid frames; adding means for adding an invalid frame just after and picked out relative to each of the valid frames and the invalid frame delayed by two frames by the second delaying means; averaging means for averaging a sum of the two invalid frames outputted from the adding means; subtracting means for computing a differential between the averaged sum of the two invalid frames and the valid frame delayed by a frame by the first delaying means; a 2-dimensional low pass filter for conducting 2-dimensional low pass filtering processing on the differential output from the subtracting means; filtering means for picking out only a portion over a predetermined value of the differentials subjected to the 2-dimensional low pass filtering processing by the 2-dimensional low pass filter; attenuating means for attenuating the level of the portion of the differential picked out by the filtering means to a range of 0–⅔; and adding means for adding the attenuated portion of the differential to the valid frame.

According to the present invention, the valid frame is delayed by a single frame and the invalid frame just before the valid frame is delayed by two frames. The invalid frames just after and before the valid frame are summed up and averaged. A differential between this averaged invalid frame and the valid frame is computed and this differential is subjected to the 2-dimensional low pass filtering processing. Only a portion over a predetermined value is picked out and this picked out differential level is attenuated to a range of 0–⅔ and the attenuated differential level is added to the valid frame. As a result, the averaged image of the invalid frames picked out and just before and after is superimposed on the 30P image, so that for even a picture having a large motion, smooth and natural images can be obtained. Specifically unnaturalness caused when a moving image is stopped suddenly can be eliminated.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a diagram showing images of respective portions obtained in the embodiment of FIG. 4;

DESCRIPTION OF THE PREFERRED EMBODIMENTS

Hereinafter, the embodiments of the present invention will be described with reference to the accompanying drawings.

Figure 1:
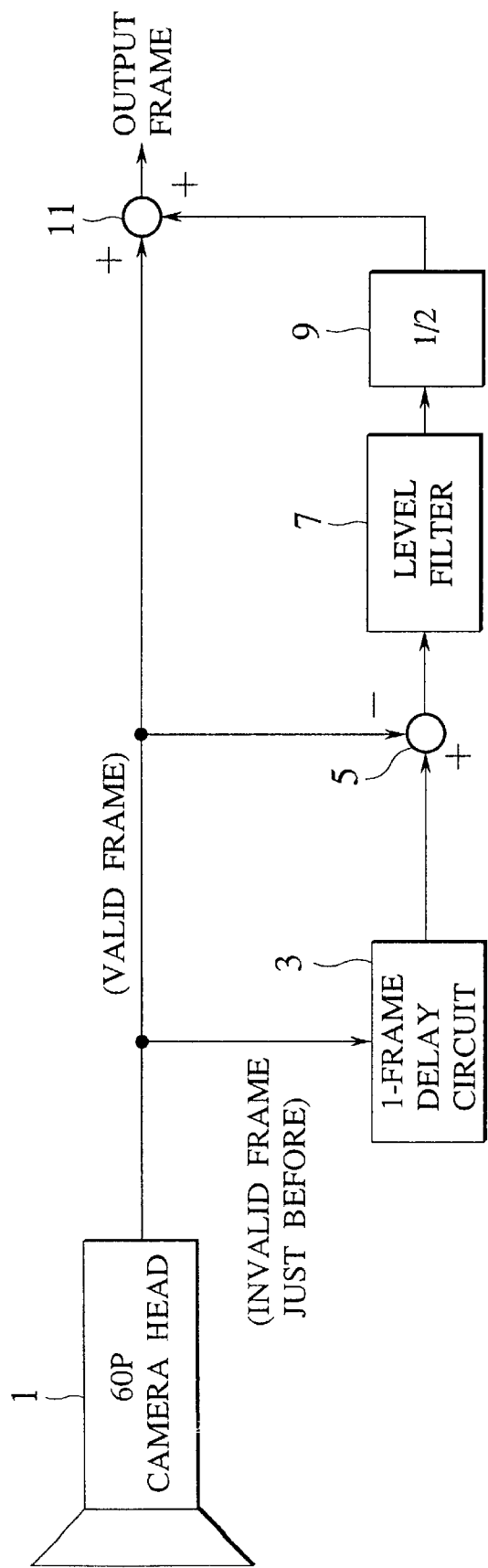
FIG. 1 is a block diagram showing a structure of an image pick-up apparatus according to a first embodiment of the present invention.

FIG. 1 is a block diagram showing a structure of an image pick-up apparatus according to a first embodiment of the present invention. The image pick-up apparatus shown in this figure includes a 60P camera head 1 which takes pictures and fetches those pictures at a rate of 60 frames. This 60P camera head 1 outputs 60P images as shown in the column (a) of FIG. 2. These 60P images are alternately thinned out (decimated) and 30P images left between the picked out ones are valid frames shown in the column (b) of FIG. 2. The picked out images between the valid frames are invalid frames.

The invalid frames picked out from the 60P images are input to a 1-frame delay circuit 3 so as to delay them and then the delayed frames are input to a subtracting circuit 5. At the same time, the valid frames from the 60P camera are directly input to the subtracting circuit 5, in which a differential between the valid frame and the invalid frame, which is a frame just before the valid frame and delayed by a frame relative thereto, is computed.

This computed differential signal between the valid frame and invalid frame is input to a level filter 7 and, of the differential signal, only a portion over a predetermined value is output from the level filter 7. The differential signal over the predetermined value is input to a ½ attenuator 9 and attenuated to ½ level. The attenuated differential signal from this ½ attenuator 9 is added to an image signal of the valid frame at an adder 11 and thereby a content of the difference between the valid frame and the invalid frame just therebefore is superimposed on that valid frame. As a result, a smooth 30P image incorporating a change of the picked out invalid frame just before are output.

Figure 2:
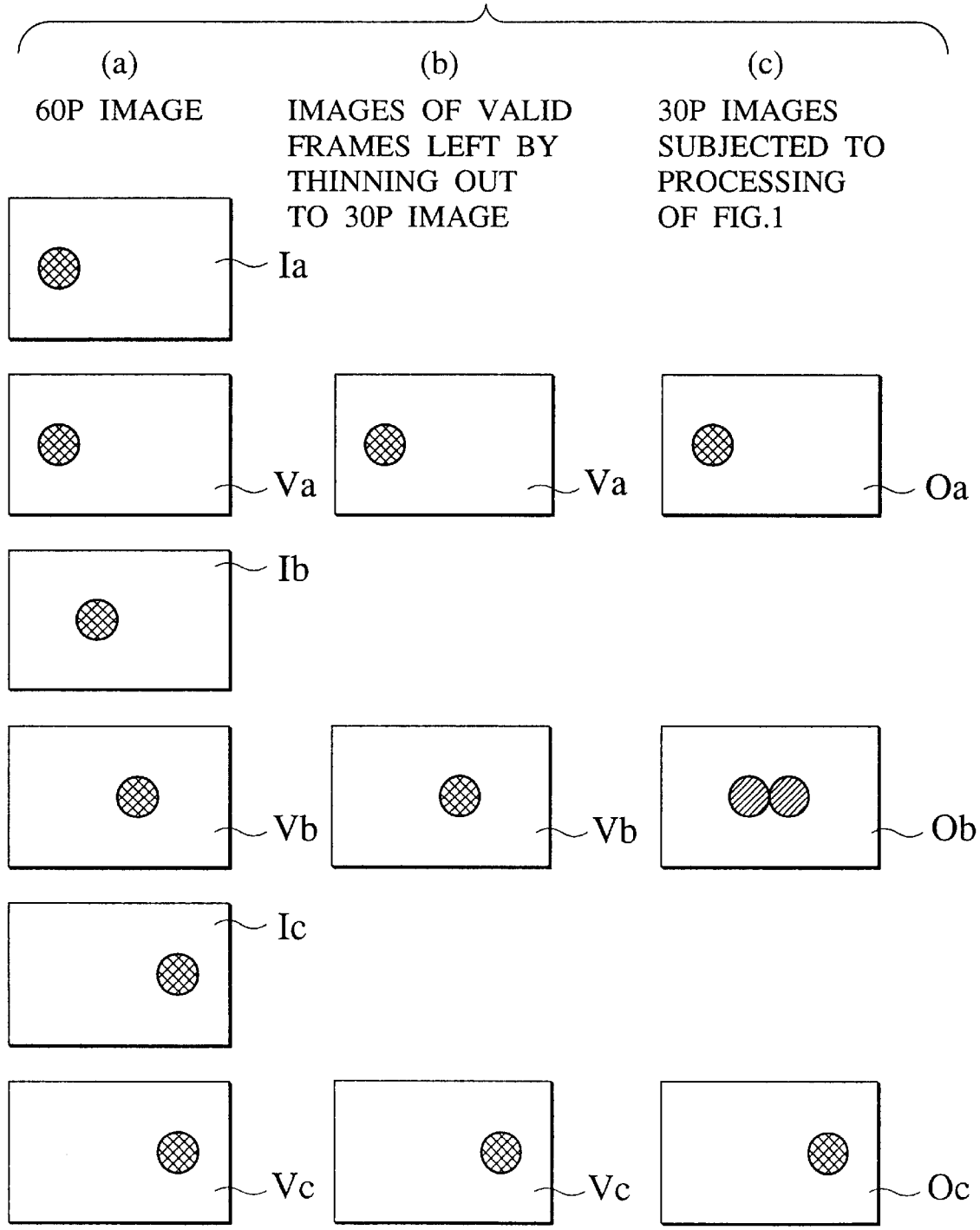
FIG. 2 is a diagram showing images of respective portions obtained in the embodiment of FIG. 1.

A further detailed description will be made referring to FIG. 2. Referring to the column (a) of FIG. 2, in which time elapses from up to down, 60P images are output in the order of Ia, Va, Ib, Vb, Ic, Vc, . . . from the 60P camera head 1 and they are alternately thinned out. The 30P valid frame images Va, Vb, Vc, . . . left between the picked out images are obtained as shown in the column (b) of FIG. 2. Although the 30P images obtained by such thinning out look slightly unnatural, according to this embodiment, the differential between an image Vi(e.g., Vb) of the 30P valid frame obtained in such a manner and an image Ii(e.g., Ib) of the invalid frame just therebefore and delayed by a frame is computed by the subtracting circuit 5 to eliminate the unnaturalness.

Of the differential signal, only a portion over the predetermined value are fetched out by the level filter 7 and attenuated to ½ by the ½ attenuator 9 and then added to the image Vi(e.g., Vb) of the valid frame by the adder 11. As a result, an image Oi (e.g., Ob) as shown in the column (c) of FIG. 2 is output. That is, the image Oi is an image considering the invalid frame image Ii just before the valid frame image Vi. In the column (c) of FIG. 2, the image Oa is an image constituted of the image Va of valid frame and the image Ia of the invalid frame just therebefore. However, because there is no change between both the images Va and Ia, the image Oa is represented as an image of a black circle shown in the figure. The same is true of the image Oc. Only in case of the image Ob, the image Vb of the valid frame is largely changed from the image Ib of the invalid frame just therebefore. Therefore, if a differential between the images Vb and Ib is superimposed on the image Vb of the valid frame, the image Vb of the valid frame and image Ib just before are displayed in superimposed condition like the indicated image Ob. The entire image level of the image Ob formed by superimposing is adjusted to the same level as other images Oa, Oc and the like, namely, the total image level is always of a constant value, for example, "1". As a result, there occurs no difference in brightness relative to an image just after so as to provide a natural image.

Figure 3:
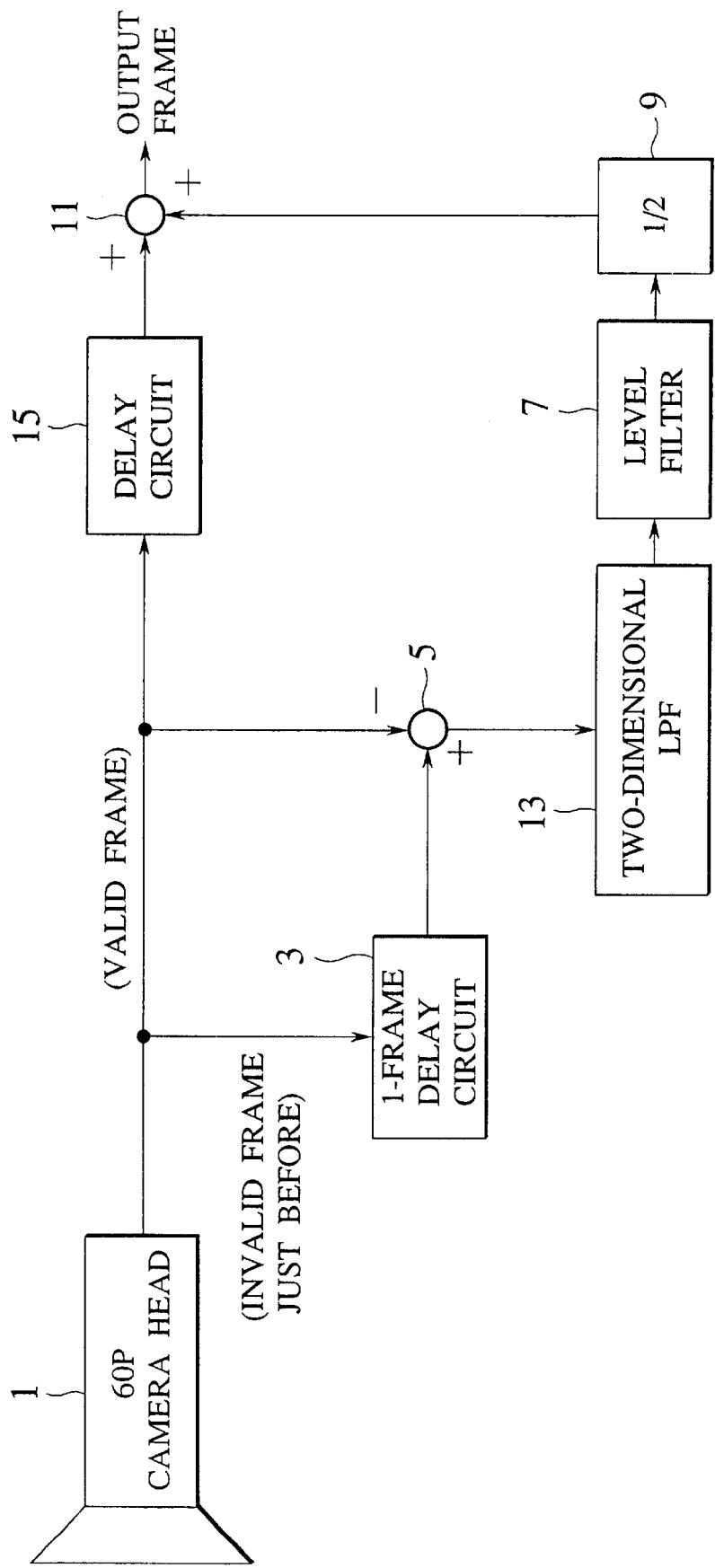
FIG. 3 is a block diagram showing a structure of an image pick-up apparatus according to a second embodiment of the present invention.

FIG. 3 is a block diagram showing a structure of an image pick-up apparatus according to a second embodiment of the present invention. The image pick-up apparatus shown in the same figure is different from the first embodiment shown in FIG. 1 in that a two-dimensional low pass filter (hereinafter referred to as two-dimensional LPF) 13 is provided on an output of the subtracting circuit 5 and at the same time, a delay circuit 15 is provided on an input side of the adder 11 to which the valid frame is to be input so as to correct a processing time of the two-dimensional LPF 13 and other structure is the same as the first embodiment. The same reference numerals are attached to the same components.

The two-dimensional LPF 13 provided on the output side of the subtracting circuit 5 filters a differential signal having a small motion amount so as to make it difficult to detect such a differential signal having a small motion amount in differentials between the valid frame and invalid frame just therebefore, thereby securing a further natural image.

Figure 4:
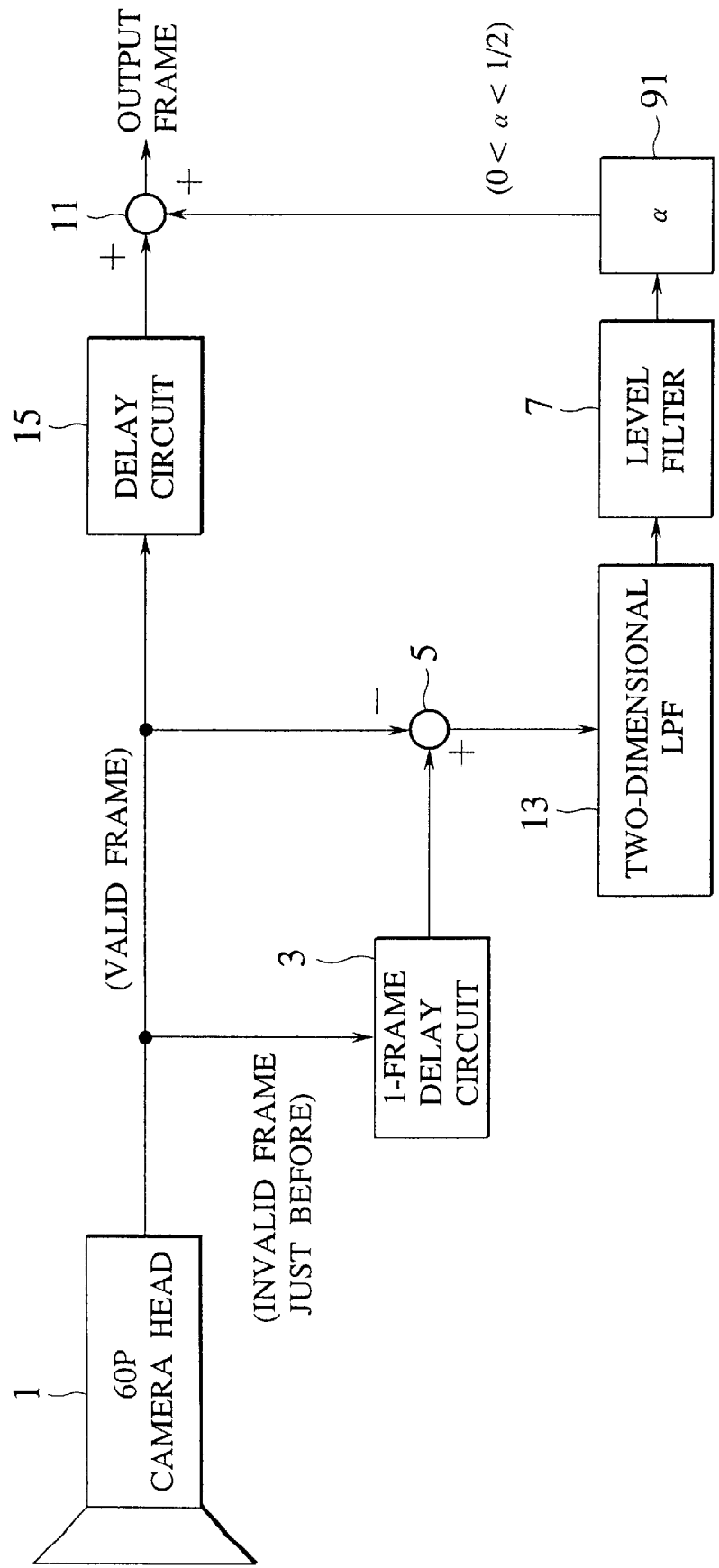
FIG. 4 is a block diagram showing a structure of an image pick-up apparatus according to a third embodiment of the present invention.

FIG. 4 is a block diagram showing a structure of an image pick-up apparatus according to a third embodiment of the present invention. The image pick-up apparatus shown in the same figure is different from the second embodiment in that instead of the ½ attenuator 9, an attenuator 91 capable of setting an adding ratio α of a motion component relative to the valid frame to be smaller than ½, namely in a range of, $0<\alpha<½$ and the other structure and operation are the same as the above described embodiment. The same reference numerals are attached to the same components.

The embodiment shown in FIG. 4 intends to eliminate a phenomenon seen unnatural which is caused when a moving image is stopped suddenly so as to obtain a further natural image. Speaking further in detail, according to the first and second embodiments, an average position of an image of a moving portion looks to exist $1/120$ seconds before its current position (because this is an average between $1/60$ seconds before and current time). Thus, if the moving image is stopped suddenly, it looks unnatural. However, if the aforementioned adding ratio α in the fourth embodiment shown in FIG. 4 is 0.25, the average position of an image of a moving portion looks to exit $1/240$ seconds before its current position (because this is an average of 25% of the image $1/60$ seconds before and 75% of the current image), so that the unnaturalness is reduced. As a result, a schematic representation of the images is as shown in FIG. 5.

Because the output of the level filter 7 in FIG. 4 contains the same quantities of positive components and negative components in the moving portion, an integral value is zero. Therefore, the integral value of a moving portion of a final output is the same as an integral value when no processing is carried out even if the value α is arbitrarily changed. Thus, a natural image can be obtained.

Figure 6:
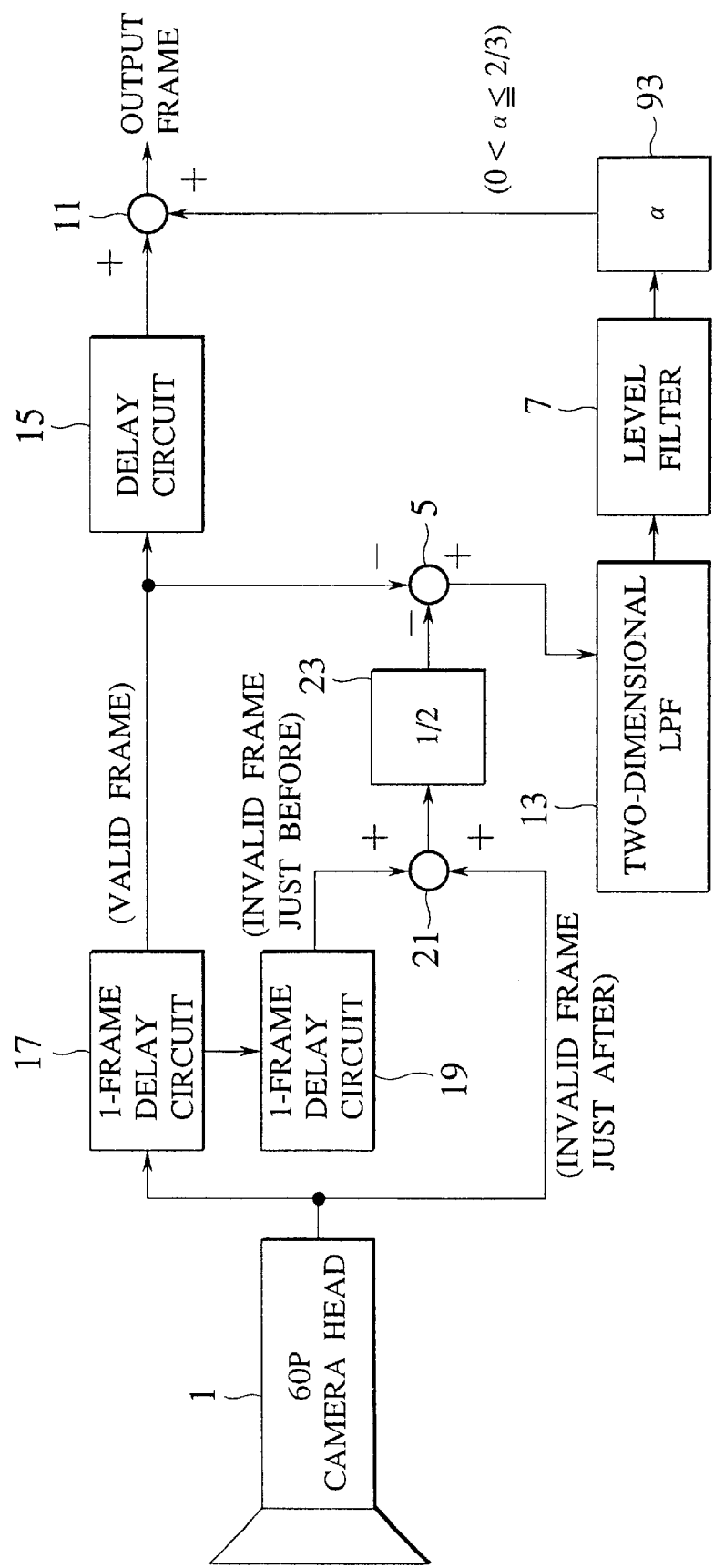
FIG. 6 is a block diagram showing a structure of an image pick-up apparatus according to a fourth embodiment of the present invention.

FIG. 6 is a block diagram showing a structure of an image pick-up apparatus according to a fourth embodiment of the present invention. In the image pick-up apparatus shown in the same figure, an average of invalid frames just before and after a valid frame is used and then a differential between this average and the valid frame is superimposed on the valid frame.

Referring to FIG. 6, a 60P image supplied from the 60P camera head 1 is delayed by a frame by a 1-frame delay circuit 17, and of the 60P images delayed by a frame, the valid frames are input to the adder 11 through a delay circuit 15. Further, of the images delayed by a frame supplied from the 1-frame delay circuit 17, the invalid frame is delayed further by a frame by the 1-frame delay circuit 19 and then input to an adding circuit 21 as an invalid frame just before. In this adding circuit 21, the invalid frame just before and invalid frame just after are summed up.

A sum signal in which the invalid frame just before and invalid frame just after are summed up is averaged by dividing by half by an averaging circuit 23. The average signal between the invalid frames just before and after is supplied to the subtracting circuit 5 so that a differential between this signal and a valid frame supplied from the 1-frame delay circuit 17 is computed. Of this differential signal, a differential signal having a small motion is filtered by the two-dimensional LPF 13, only a portion below a predetermined value is fetched out by the level filter 7 and then such a processed signal is input to an attenuator 93 having an adding ratio α in a range of $0<\alpha\leq⅔$. The image level is reduced at the adding ratio α and then that signal is superimposed on the valid frame at the adder 11.

Figure 7:
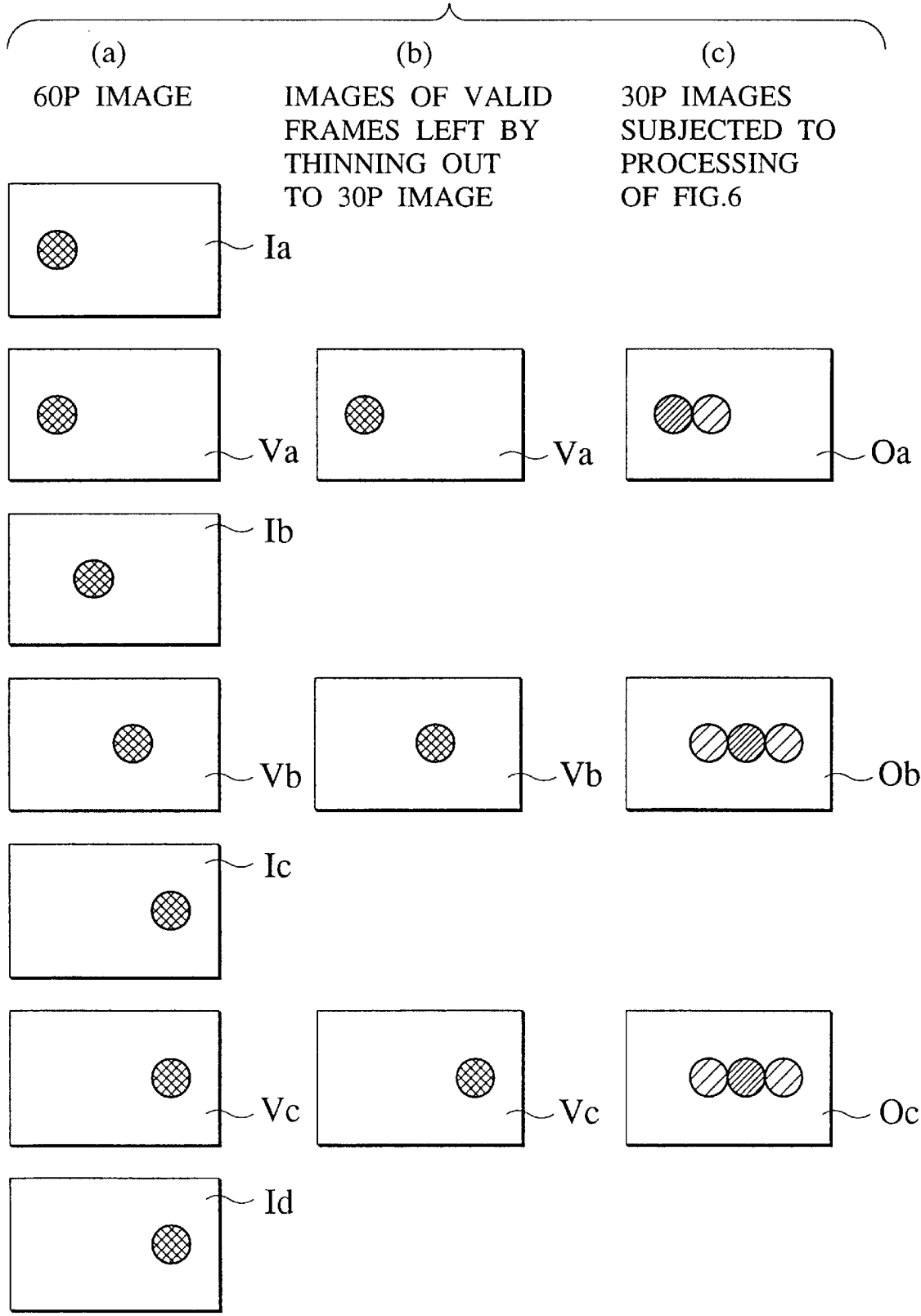
FIG. 7 is a diagram showing images of respective portions obtained in the embodiment of FIG. 6.

In the embodiment of FIG. 6, the image on which the average between the invalid frames just before and after the valid frame is superimposed as described above is a further natural image as shown in the column (c) of FIG. 7. Referring to an image in the center of the column (c) of FIG. 7, an image Vb of a valid frame is displayed in the center thereof, while an invalid frame image Ib just before is displayed on the left and an invalid frame image Ib just after is displayed on the right.

That is, according to this embodiment, an average time of the two invalid frames just before and after is the same as that of the valid frame. Thus, the average position of an image of a moving portion is not deviated forward so that unnaturalness caused when the moving image is stopped suddenly can be eliminated. The reason why the adding ratio α in the attenuator 93 is in a range of $0<\alpha<⅔$ is that if this value is exceeded, the center black circle of three black circles relating to a moving portion becomes the thinnest thereby producing unnaturalness. Meanwhile, because the output of the level filter 7 contains the same quantities of positive component and negative component in moving portion, its integral value is zero. Therefore, the integral value of the motion portion of a final output is the same as an integral value when no processing is carried out even if the value α is arbitrarily changed like the embodiment of FIG. 4, so that a natural image can be obtained.

It should be understood that many modifications and adaptations of the invention will become apparent to those skilled in the art and it is intended to encompass such obvious modifications and changes in the scope of the claims appended hereto.

What is claimed is:

1. An image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising:

delaying means for delaying an invalid frame just before and picked out by a single frame relative to each of the second predetermined number of valid frames;

subtracting means for computing a differential between the delayed invalid frame and a corresponding valid frame;

filtering means for picking out only a portion over a predetermined value of the differential outputted from the subtracting means;

attenuating means for attenuating the level of the portion of the differential picked out by the filtering means to ½; and adding means for adding the attenuated portion of the differential to the corresponding valid frame.

2. An image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising:

delaying means for delaying an invalid frame just before and picked out by a single frame relative to each of the second predetermined number of valid frames;

subtracting means for computing a differential between the delayed invalid frame and a corresponding valid frame;

2-dimensional low pass filter for conducting 2-dimensional low pass filtering processing on the differential output from the subtracting means;

filtering means for picking up only a portion over a predetermined value of the differential subjected to the 2-dimensional low pass filtering processing by the 2-dimensional low pass filter;

attenuating means for attenuating the level of the portion of the differential picked up by the filtering means to ½; and adding means for adding the attenuated portion of the differential to the corresponding valid frame.

3. An image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising:

delaying means for delaying an invalid frame just before and picked out by a single frame relative to each of the second predetermined number of valid frames;

subtracting means for computing a differential between the delayed invalid frame and a corresponding valid frame;

2-dimensional low pass filter for conducting 2-dimensional low pass filtering processing on the differential output from the subtracting means;

filtering means for picking up only a portion over a predetermined value of the differential subjected to the 2-dimensional low pass filtering processing by the 2-dimensional low pass filter;

attenuating means for attenuating the level of the portion of the differential picked up by the filtering means to a range of 0–½; and adding means for adding the attenuated portion of the differential to the corresponding valid frame.

4. An image pick-up apparatus for thinning out, at a predetermined interval, a plurality of image frames outputted from a camera for taking and outputting pictures as a first predetermined number of frames per second, so as to output a second predetermined number of image frames per second, the second predetermined number being smaller than the first predetermined number, the image pick-up apparatus comprising:

first delaying means for delaying each of the second predetermined number of valid frames by a frame;

second delaying means for delaying an invalid frame just before and picked out relative to each of the valid frames;

adding means for adding an invalid frame just after and picked out relative to each of the valid frames and the invalid frame delayed by two frames by the second delaying means;

averaging means for averaging a sum of the two invalid frames outputted from the adding means;

subtracting means for computing a differential between the averaged sum of the two invalid frames and the valid frame delayed by a frame by the first delaying means;

2-dimensional low pass filter for conducting 2-dimensional low pass filtering processing on the differential output from the subtracting means;

filtering means for picking out only a portion over a predetermined value of the differentials subjected to the 2-dimensional low pass filtering processing by the 2-dimensional low pass filter;

attenuating means for attenuating the level of the portion of the differential picked out by the filtering means to a range of 0–⅔; and adding means for adding the attenuated portion of the differential to the valid frame.

* * * * *